Figure 1:
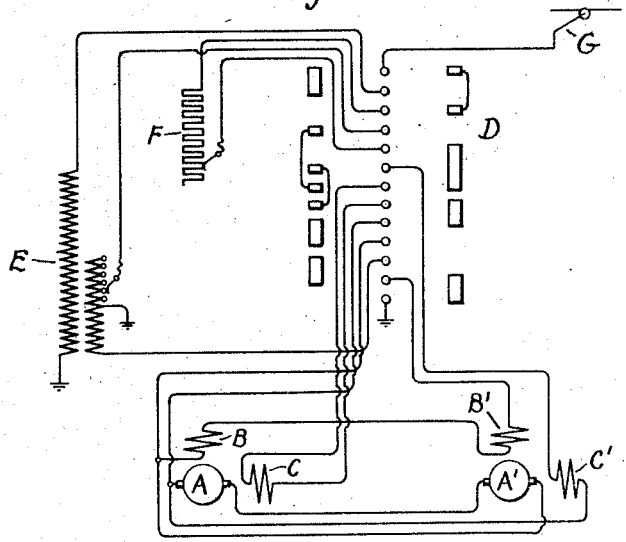

No. 885,128. PATENTED APR. 21, 1908.
E. F. W. ALEXANDERSON.
MOTOR CONTROL.
APPLICATION FILED JAN. 26, 1907.

Witnesses:
Irving E. Steers
J. Ellis Glenn.

Inventor
Ernst F. W. Alexanderson,
by Albert G. Davis
Atty.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR CONTROL.

No. 885,128.   Specification of Letters Patent.   Patented April 21, 1908.

Application filed January 26, 1907. Serial No. 354,259.

*To all whom it may concern:*

Be it known that I, ERNST F. W. ALEXANDERSON, a subject of the King of Sweden, residing at Schenectady, county of Schenectady, State of New York, have invented certain new and useful Improvements in Motor Control, of which the following is a specification.

My invention relates to the control of commutator motors, which are designed to be operated as series motors on direct-current and as repulsion motors on alternating-current, and its object is to provide a novel control system for such motors possessing a number of advantageous features.

It is frequently desirable to operate commutator motors both on direct and alternating-current—as, for instance, in the case of a railway, which is operated over part of its length on direct-current, and over another part of its length on alternating-current. If the motors are operated as series motors on both direct and alternating-current, the alternating-voltage supplied to the motors must ordinarily be lower than it is permissible to use when the motors are operating on direct-current, because the difficulties of commutation are greater in alternating-current operation. Consequently, the motor leads and connecting wires must be larger than would be required for direct-current operation alone. By operating the motors as repulsion motors for alternating-current operation, the alternating-voltage may be increased and the alternating-current decreased as much as desired, since the motor armatures are short-circuited, and no commutation difficulties arise due to the increase in voltage. But if the alternating-voltage is made greater than the voltage employed for direct-current operation, the strain on the motor insulation, with control systems heretofore employed, will be increased.

One of the features of my invention consists in so arranging the control system that the alternating-current voltage may be made twice that of the direct-current, without increasing the strain on the insulation of the motors. I accomplish this result by grounding a point between the terminals of the transformer winding which acts as the source of alternating-current for the motors, so that by connecting the terminals of the motor circuit to points on the transformer winding on opposite sides of the grounded point the total voltage impressed on the motor circuit may be twice that existing between any motor winding and ground. Consequently, although the alternating-voltage may be twice that of the direct-voltage, the insulation strain is not increased. This feature of my invention is not necessarily limited to motors connected as repulsion motors for alternating-current operation.

When a motor is to be operated as a series motor on direct-current and as a repulsion motor on alternating-current, it is ordinarily desirable to divide the field winding into two portions, one of which is arranged with its axis at right-angles to the line of armature magnetization, serves as the exciting or field winding for both operations, while the other, which has its axis parallel to the line of magnetization of the armature, serves as a compensating winding for direct-current operation, and as the inducing winding for alternating-current operation. If these two field windings, or portions of the field winding, are proportioned with a relative number of turns adapted to produce the most satisfactory operation for the direct-current series connection, the proportions will not be the best possible for the alternating-current repulsion motor operation.

One feature of my invention consists in increasing the effective ampere turns of the compensating or inducing winding relative to the exciting winding when changing from the direct-current series connection to the alternating-current repulsion motor connection. If the alternating-current voltage were the same as, or less than the direct-current voltage, this change in the relative numbers of ampere turns in the two windings would preferably be made by decreasing the number of effective ampere turns of the exciting winding when shifting from direct to alternating-current connections; but if the alternating-current voltage is greater than that of the direct-current voltage, the change is preferably made by increasing the effective ampere turns of the compensating or inducing winding when changing from direct to alternating-current operation. In the control of more than one motor I prefer to produce this result by connecting the compensating windings in parallel for direct-current operation, and in series for alternating-current operation.

When the relative ampere turns of the compensating windings are varied by increasing the effective ampere turns of the compensating or inducing winding, when changing from direct to alternating-current operation, the effective number of turns of the inducing winding for alternating-current operation is increased relative to the armature ampere turns. Consequently, the armature current is increased relative to the current flowing through the field windings of the motor. With the usual connections employed for repulsion-motor operation, this increase of the armature current would necessitate employing short-circuiting connections for the armature of greater cross-section than are required for the field winding connections. One feature of my invention consists in so arranging the repulsion-motor connections that the short-circuiting connection need not be of greater size than the other conducting leads. I accomplish this by forming the short-circuit without breaking the series connection between the armature and the field windings, so that the short-circuit connection between the armature brushes has to carry only the difference between the armature current and that in the field windings.

Figure 2:
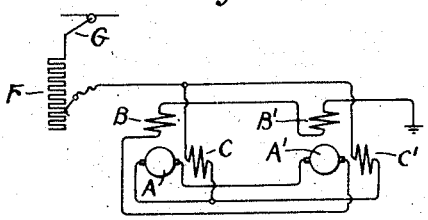
Figure 3:
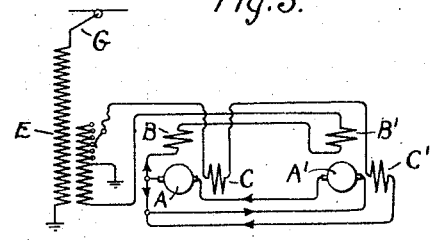
Figure 4:
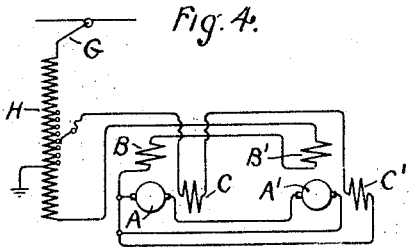

My invention will best be understood by reference to the accompanying drawings, in which Figure 1 shows diagrammatically a control system for a pair of commutator motors arranged in accordance with my invention; Figs. 2 and 3 show the circuit connections produced by the controlling switch of Fig. 1, for direct and alternating-current operation, respectively; and Fig. 4 shows a modification of Fig. 3.

In the drawings A A' represent the armatures of two commutator motors.

B B' represent the exciting or field windings of the motors arranged to produce magnetizations at right-angles to the magnetization produced by the armature current.

C C' represent windings having their axes in line with the lines of magnetization of the armatures, and serving as compensating windings for direct-current operation, and as inducing windings for alternating-current operation.

D represents a commutating switch for connecting the motor for either alternating or direct-current operation.

E represents a transformer serving as the source of alternating-current. The primary winding has one terminal connected through switch D to the trolley, or other current-collecting device, G, and its other terminal grounded. The secondary winding of the transformer has its central point grounded, and means is provided for connecting the motors to different points on the transformer winding on opposite sides of the ground connection. It will be seen that with this arrangement the voltage impressed on the motor circuit may be twice as great as the voltage existing between any motor winding and ground, or in other words, between any part of the motor winding and the motor frame which is of course at ground potential, so that the insulation strain on any motor winding will not be greater than due to half the maximum voltage impressed on the motor circuit.

F represents a variable resistance for controlling the direct current voltage impressed on the motor circuit.

When the switch D is moved to bring the right hand movable contacts into engagement with the contact fingers, the circuit connections shown in Fig. 2 are established. The current enters through the collecting device G, and passes through a variable portion of resistance F. It then divides, passing through the compensating windings C C' in parallel. The current then passes through the armatures A and A' in series, and through the field or exciting windings B B' to ground. The field and armature windings of the two motors are thus connected in series, while the compensating windings are connected in parallel with each other, and in series with the other windings. This connection is that ordinarily employed for direct-current series motors, except that the compensating windings are in parallel. Owing to this parallel connection, the current through each compensating winding is one-half that passing through each motor armature. Consequently, the compensating windings should each possess approximately a little more than twice the effective number of turns of each armature winding.

When the left-hand movable contacts of switch D, in Fig. 1, are brought into contact with the contact fingers, the connections shown in Fig. 3 are established. The primary winding of transformer E is connected between the collecting device G and ground, and a connection is established from the movable secondary contact through the compensating windings C C' in series, then through the armatures A and A' in series, and through the field windings B and B' in series to the lower secondary terminal of transformer E. It will be seen that the armatures A and A' are short-circuited, but the connections of the armatures are such that the current passing through the compensating or inducing windings and the field windings does not pass through the short-circuit, but passes through the motor armatures. The relative directions of current at any instant are as indicated by the arrowheads, and since the inducing windings C are now connected in series, instead of in parallel, and since each inducing winding has twice the effective turns of the corresponding armature, the armature current must be approximately twice the current in the inducing windings. Consequently, if 500 amperes are flowing through the inducing windings, approximately 1,000 amperes will be flowing through the armature windings. Of this, 500 will be flowing through the field windings, and the 500 will be passing through the short-circuit connections, as shown by the arrow-heads. Consequently the short circuit connections need carry only half the current flowing through the armatures. It should further be noted that the change in the connection of the inducing or compensating windings from parallel to series increases their effective ampere turns with respect to the exciting windings for alternating-current operation. By this increase the best proportions of ampere turns of the two windings are secured for both direct and alternating-current operation.

In Fig. 1 I have shown a two-coil transformer for supplying the alternating-current to the motors. If a single coil, or auto-transformer, is employed, the same result with respect to the relative amounts of the total voltage on the motor circuit and the voltage between the motor windings and ground may be obtained by the arrangement of Fig. 4, in which H represents the auto-transformer winding, which has a point intermediate its terminals connected to ground. Except for the transformer, this figure is the same as Fig. 3, and requires no further explanation.

In order to simplify the drawings as far as possible, I have merely indicated diagrammatically switching means for controlling the amount of transformer winding and resistances in circuit. Furthermore, I have not shown a reversing switch, nor other details, which would ordinarily be employed in the control system of a locomotive or car. All the switches and the arrangement of the control system may be of any well known type. Accordingly, I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a commutator motor, means for connecting said motor as a series motor for operation on direct-current, means for connecting said motor as a repulsion motor for operation on alternating current, a transformer winding adapted to supply alternating-current to said motor having a point between its terminals grounded, and means for establishing connections from the motor circuit to points on said winding on opposite sides of the grounded point.

2. In combination with a commutator motor, means for connecting the armature in series with the field windings for operation on direct-current, means for short-circuiting the armature for operation on alternating-current, a transformer winding having a point between its terminals grounded, and means for establishing connections from the motor circuit to points on said winding on opposite sides of the grounded point.

3. In combination with a commutator motor having an exciting winding and a compensating or inducing winding on its field structure, means for connecting said windings in series with the armature for direct-current operation, and means for short-circuiting the armature for alternating-current operation without breaking said series connection, whereby the short-circuit connection carries only the difference of the armature current and the current in other windings.

4. In combination with a commutator motor having an exciting winding and a compensating or inducing winding on its field structure, means for connecting said windings in series with the armature for direct-current operation, and means for short-circuiting the armature for alternating-current operation and increasing the effective ampere turns of the inducing winding relatively to the exciting winding.

5. In combination with a commutator motor having an exciting winding and a compensating or inducing winding on its field structure, means for connecting said windings in series with the armature for direct-current operation, and means for short-circuiting the armature for alternating-current operation and increasing the effective ampere turns of the inducing winding relatively to the exciting winding and to the armature.

6. In combination with a commutator motor having an exciting winding and a compensating or inducing winding on its field armature, means for connecting said windings in series with the armature for direct-current operation, and means for increasing the effective ampere turns of the inducing winding relatively to the exciting winding and to the armature and for alternating-current operation and short-circuiting the armature without breaking the series connection, whereby the short-circuiting connection carries only the difference of the armature current and the current in the other windings.

7. In combination with a pair of commutator motors each having an exciting winding and a compensating or inducing winding on its field structure, means for connecting the exciting windings and armatures of both motors in series with each other and connecting the compensating windings in parallel with each other and in series with the other windings for direct-current operation, and means for connecting the compensating windings in series with each other and short-circuiting the armatures for alternating-current operation.

8. In combination with a motor adapted for operation on alternating-current, a transformer winding adapted to supply alternating-current to said motor having a point between its terminals grounded, means for establishing connections from the motor circuit to points on said winding on opposite sides of the grounded point, and means for varying the voltage impressed on the motor circuit.

9. In combination with a motor adapted for operation on alternating-current, a transformer winding adapted to supply alternating-current to said motor having a point between its terminals grounded, and means for establishing connections from the motor circuit to points on said winding on opposite sides of the grounded point and for varying the number of transformer turns included between said points of connection.

In witness whereof, I have hereunto set my hand this 25th day of January, 1907.

ERNST F. W. ALEXANDERSON.

Witnesses:
   BENJAMIN B. HULL,
   HELEN ORFORD.